United States Patent [19]
van Spijker

[11] 4,068,380
[45] Jan. 17, 1978

[54] DEVICE FOR DIVIDING AN ANGLE

[76] Inventor: Willem van Spijker, Valeriusstraat 181 boven, Amsterdam, Netherlands

[21] Appl. No.: 589,851

[22] Filed: June 24, 1975

[51] Int. Cl.² ............................................. G01B 3/56
[52] U.S. Cl. ................................................. 33/1 AP
[58] Field of Search ...................... 33/1 AP, 1 B, 1 N

[56] References Cited

U.S. PATENT DOCUMENTS

| 1,294,935 | 2/1919 | Milliken | 33/1 AP |
| 3,370,354 | 2/1968 | Schiff | 33/1 AP |

FOREIGN PATENT DOCUMENTS

| 913,705 | 6/1954 | Germany | 33/1 AP |
| 600,213 | 7/1934 | Germany | 33/1 AP |

Primary Examiner—William D. Martin, Jr.
Attorney, Agent, or Firm—Karl W. Flocks

[57] ABSTRACT

Device for dividing an angle into equal or proportional parts, comprising the surface flattened or not of a right cone, of which the axis is adjustable through the vertex of the angle, on which surface a describing line and a number of lines corresponding to the number of angles into which the angle has to be divided, are or can be provided such that they all pass through a point on said describing line and divide into equal or proportional parts the circular arcs constituted by the planes perpendicular to the cone axis and the surface and lying between the intersection points of these circular arcs and the line most remote from said describing line.

6 Claims, 5 Drawing Figures

DEVICE FOR DIVIDING AN ANGLE

The invention relates to a device for dividing an angle into equal parts or into parts with a certain proportion with respect to each other.

Contrary to the simple construction of dividing an angle into two equal parts, the division of an angle into three or more parts presents constructive problems. In general, use is then made of a protractor, with which the angle to be divided must first be measured and subsequently, after some calculations, the different parts of the angle must be set out.

The purpose of the present invention is to provide a device, with which an angle can easily be divided into any number of equal parts or into parts with a certain proportion with respect to each other.

The device according to the invention is characterized by the surface of a right cone, of which the axis perpendicular to the plane in which the angle is lying, is adjustable through the vertex of the angle, on which surface a describing line as zero line and a number of lines corresponding to the number of angles into which the angle is to be divided, are or can be provided in such a way that they all pass through one point on the zero line and divide into equal or proportional parts the circular arcs, which are constituted by the planes perpendicular to the cone axis and the surface and which are lying between the intersection points of the circular arcs with the zero line and the line which is the most remote from this zero line.

The essential of the invention resides in the fact, that use is made of the surface of a right cone, by cone being understood a usual cone as well as a cone with an infinite altitude (cylinder).

By thinking the axis of this cone on the vertex of the angle to be divided in such a way, that the plane through the legs of this angle is perpendicular to the axis of the cone at such a height, that the zero line intersects one of the legs and that the outer of the angle-dividing lines intersects the other legs, it will be obvious that between said two lines of the line system the angle has been divided into equal or proportional parts.

It is not of primary importance that the spiral lines are provided before-hand on the surface of the cone. As will appear from the following, in particular types these lines can easily be provided afterwards by the draughtsman.

In one type of the device according to the invention a cylinder is used, which is provided at one of its surfaces perpendicular to its vertical axis with a fixed radial adjusting device, along which one of the legs of the angle to be divided is adjustable and to which the zero line connects, as well as with an adjusting device, which rotates around the axis and which is adjustable along the other leg of the angle to be provided and to which is connected a device following a second describing line, whereas an annular adjusting device is provided axially slidable around the cone or cylinder surface in a plane perpendicular to the axis.

By placing the cylinder axis with e.g. a point protruding from a top surface into the vertex of the angle, the cylinder can be turned in such a way that the fixed adjusting device comes to lie along one leg of the angle. Subsequently the rotating adjusting device is placed along the other leg. At this adjustment, the device following a second describing line will somewhere intersect the spiral line which is the most remote from the zero line. The annular adjusting device determines the projection of the angle to be divided on such a height along the axis, that the legs of the angle intersect the zero line, respectively the most remote spiral line.

The other spiral lines now divide the arc, which has been determined in this way, into equal or proportional parts. By subsequently bringing the rotating adjusting device on the intersection points of the last-mentioned spiral lines by means of the annular adjusting device, these parts can be projected again in the plane of the angle to be divided.

It is of no importance whether the cylinder is rotatable around the axis and the rotatable adjusting device is fixed to the axis, or whether the cylinder is fixed to the axis and the rotatable adjusting device can turn around the axis. The rotatable adjusting device only has to be rotatable with respect to the cylinder.

Both radial adjusting devices can e.g. be carried out as narrow rulers, which protrude beyond the cone surface. Another indication, however, is also possible, e.g. an arrow or point indication.

The material of which the cylinder is made, can be chosen at will. Usually a transparent, synthetic material will be chosen, so that the placing of the cylinder axis in the vertex of the angle is easily visible. This placing can be simplified when the cylinder with the adjusting devices can slide axially on the axis. The axis can then first be put accurately in the vertex of the angle, whereafter the cylinder is placed around the axis.

In principle the zero line and the spiral lines can be provided permanently on the surface of the cylinder. The disadvantage thereof, however, is that a number of cylinders is necessary or that a great number of spiral lines must be provided for carrying out several angle divisions. With e.g. five spiral lines an angle cannot only be divided into five equal or proportional parts, but also into four, three and two parts, in which cases always the spiral line following in the direction of the zero line is considered as the spiral line which is the most remote from the zero line.

To avoid this disadvantage of a permanent line system on the surface, an advantageous type of the device according to the invention consists in the cylinder with the different adjusting devices thereon, where the zero line and the device following a second describing line are carried out as clamped devices, and in separate line systems provided on flat, flexible material for dividing an angle into equal or proportional parts.

With this type the draughtsman can always apply on the cylinder the line system which he needs. The line systems can easily be constructed on a sheet of flexible material such as paper as straight lines, which part from one single point on a zero line and which cut equal or proportional parts from an arbitrary line which is perpendicular to the zero line When the device according to the invention is used with a drawing table, it is advantageous that the cylinder is pivot-mounted at the end of an arm which can be lengthened or shortened and which is rotatable around and slidable along an axis mounted on the drawing table. With this type a fixed position of drawing table and device according to the invention can be obtained.

The weight of the device according to the invention at one end of the arm can be compensated in any way, e.g. by means of a spring.

It is, however, inexpensive and thus advantageous that the arm be one arm of a lever, a counterweight being provided at the arm opposite the cylinder. This counterweight may or may not be slidable. If it is, the draughtsman can adjust it to his own judgment.

Above, a three dimensional type of the device according to the invention has been discussed. This device, however, may also be carried out two-dimensionally in such a way that the surface of the right cone with finite altitude is brought into a flat plane and the line system for the division of the angle is applied on a sheet or leaf. With this type, the spiral lines have been provided beforehand on a sheet or leaf. The sheet or leaf may simply consist of paper but also of transparent or coloured synthetic material, so that a stencil is formed. This stencil can be placed under the drawing paper, whereafter the division of the angle can be carried out easily.

In a particularly appropriate type of this two-dimensional device, the surface is constituted by two or more stencils, where the circumference of each divide the zero line, one of the lines which divide the circular arcs into equal or proportional parts, and follow a second describing line. The device according to the invention then consists of a number of stencils corresponding to the number of angles, into which the angle is to be divided, which stencils can be placed on top of the drawing paper. It will be obvious that these separate stencils may form one single unit.

Another two-dimensional type of the device according to the invention is obtained when the surface of a right cone with finite altitude is brought into a flat plane and when on a sheet or leaf a number of describing lines of the surface and a number of circular arcs around the centre formed by the top angle have been provided. With this type, the draughtsman can place the spiral lines at will and in a simple way. The advantage of this type is that it is simple and thus inexpensive. On the other hand, the problem of the construction of the spiral lines is transferred to the draughtsman, who has no direct means for placing these lines accurately.

The invention will now be explained by means of the drawing, in which.

Figure 1:
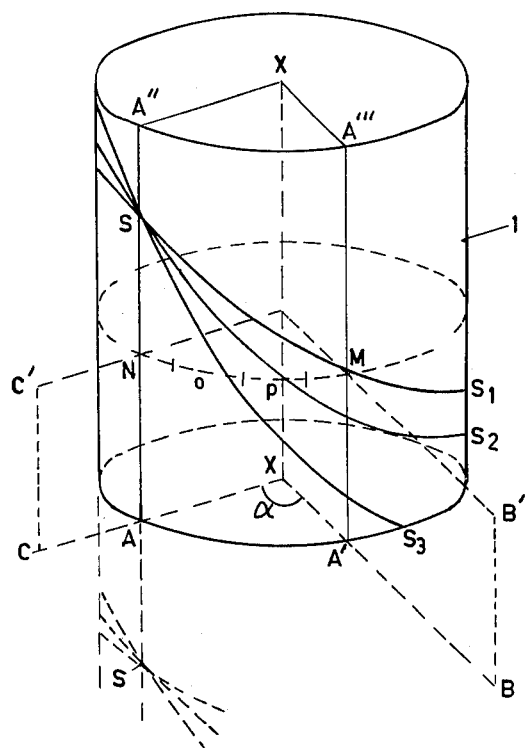
FIG. 1 shows the principle of a first type of the device according to the invention.

In FIG. 1 the angle $\alpha$ is to be divided into three equal parts. For that purpose, the axis XX of a cylinder 1 is placed on the vertex of this angle. Through the intersection points A, A' of the ground circle with the legs XC and XB respectively, describing lines parallel to the axis XX can be drawn on the surface of the cylinder. In the example, one of these lines serves as zero line AA". These lines can also be seen as intersecting lines of two planes through the axis XX and the two legs of the angle $\alpha$ with the surface of the cylinder.

At an arbitrary place on the zero line AA" a point S is chosen. Through this point S three spiral lines $SS_1$, $SS_2$ and $SS_3$ are drawn in such a way, that they divide into three equal parts each arc constituted by the surface and a plane perpendicular to the axis XX between the zero line AA" and the spiral line $SS_1$ which is the most remote from the zero line AA". When the angle $\alpha$ is to be divided into unequal parts with a certain, arbitrary proportion with respect to each other, the spiral lines are drawn in such a way that they divide into parts with the chosen proportions each arc formed by the surface and a plane perpendicular to the axis XX between the zero line AA" and the spiral line which is the most remote from the zero line AA". The spiral lines will all converge in a point S' on the zero line AA", the spiral line $SS_1$ having thrice, the spiral line $SS_2$ having twice and the spiral line $SS_3$ having once gone around the surface.

Now the describing line A'A'" will intersect the spiral line $SS_1$ in M. By drawing through this intersection point M a plane perpendicular to the axis XX, an arc MN is formed, which equals the arc AA' and thus equals the angle $\alpha$. By the nature of the spiral lines this arc is now divided into three equal parts NO, OP and PM. These parts of the arc can be projected on the arc AA', which achieves the division of the angle $\alpha$.

Figure 2:
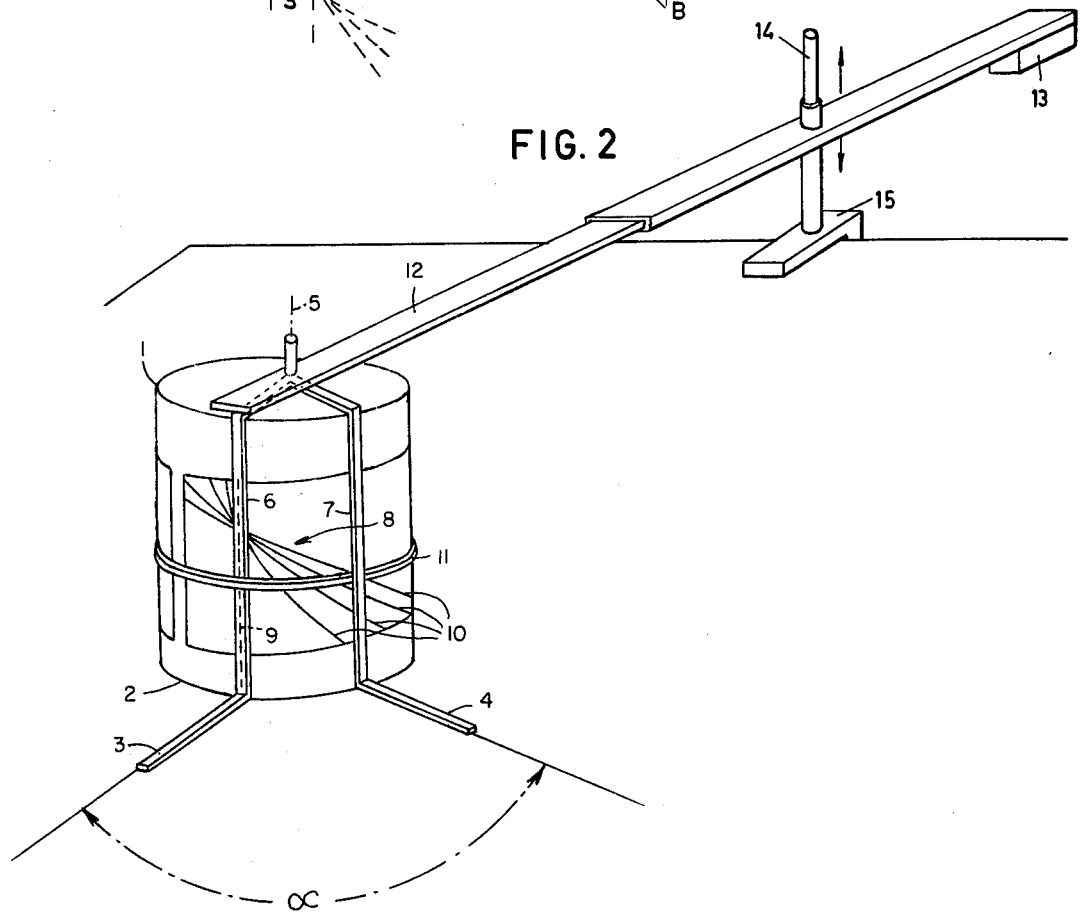
FIG. 2 shows a perspective view of the first type according to the principle of FIG. 1.

FIG. 2 shows an advantageous type of the device according to the invention, in which the principle described has been realized. This device consists again of the cylinder 1, which is provided at its bottom surface 2 with a fixed radial adjusting device 3. At the same bottom surface 2 a second radial adjusting device 4 has been provided, which is rotatable around the axis 5 with respect to the cylinder. In the drawing, these adjusting devices are shown as narrow rulers. The device is now placed on the angle to be divided in such a way, that the angle is indicated by these two rulers.

On both adjusting devices, elements 6 and 7 are provided, which follow a describing line. The element 6 corresponds with the zero line, which may be provided permanently on the cylinder surface or which may be part of a separate line system. The drawing shows the case, in which use is made of a separate line system 8. The zero line 9 of this line system 8 is then placed under the element 6, which may be carried out as a clamp element. In this case, the line system has four spiral lines 10. The device further has an annular adjusting device 11, which is axially slidable around the cylinder 1.

For the division of the angle, this annular device 11 is slid to that height where the element 7 intersects the spiral line 10 which is the most remote from the zero line 9. The annular device is held or clamped at this height. Subsequently the rotatable adjusting device 4 is turned so that the element 7 passes through the intersection points of the spiral lines 10 with the annular device 11. Thus the angle is divided, in the case shown, into four equal parts.

For reinforcement, the elements 6 and 7 at the top surface can be bent towards the axis and attached thereto.

In the type shown in FIG. 2, the cylinder 1 is attached to the end of one arm of a lever 12. This arm can be lengthened or shortened, so that the entire drawing table can be covered. The arm does not have to be carried out as shown, but may have any possible shape. E.g. a straight or parallelogram guiding can be applied. A counterweight, which may or may not be slidable, is provided at the other arm for weight compensation. The lever 12 can rotate around and slide along an axis. The axis 14 is mounted on a clamp, whereafter the entire device can be clamped to a drawing table.

Figure 3:
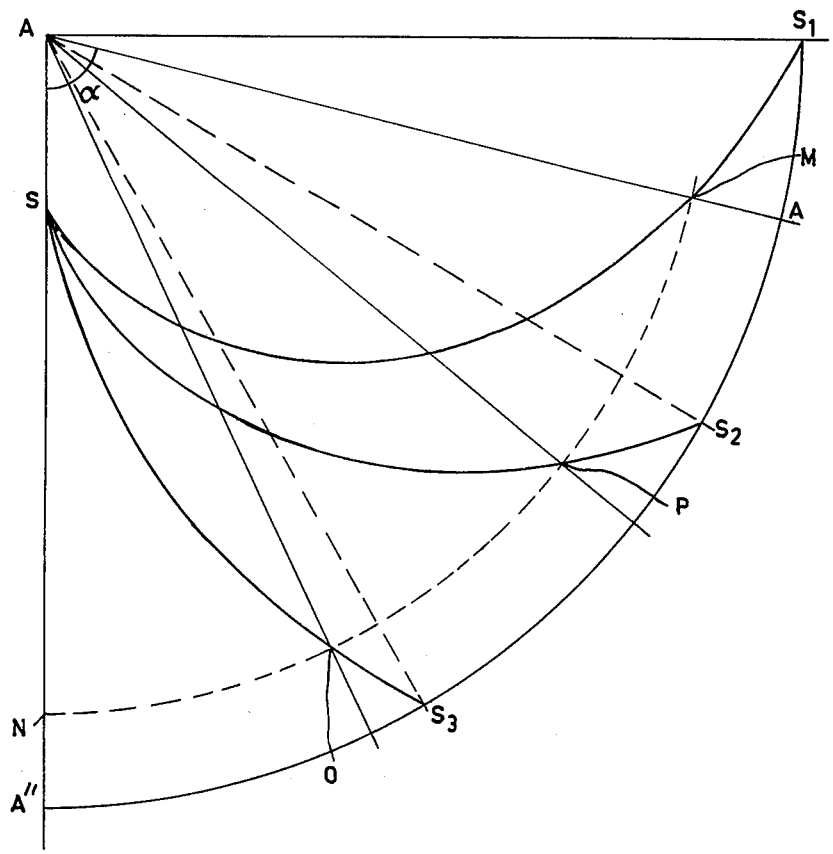
FIG. 3 shows a second type of the device according to the invention.

The type of FIG. 3 consists of a flat object, on which a zero line AA" and spiral lines $SS_1$, $SS_2$ and $SS_3$ have been provided, the point S being on the zero line AA" and the points $S_1$, $S_2$ and $S_3$ being on a circle around point A. In this type of the device according to the invention, the surface of the right cone is flattened into a flat plane. In this case too, the spiral lines are constructed in such a way that always equal parts of an arc of the circles around point A are cut off.

The procedure for dividing an angle is as follows. The point A is first placed in the vertex of the angle $\alpha$ in such a way, that one of the legs of this angle covers the zero line AA". The other leg AA' intersects at M the spiral line $SS_4$ which is the most remote from the zero line AA".

A circle with center point A is drawn through this point M. The intersection points P and O of this circle with the spiral lines $SS_2$ and $SS_3$ divide this circle into equal arc-parts NO. OP and PM. The lines AO and AP can now be drawn from A, so that the angle $\alpha$ has been divided into three equal angles.

Figure 4:
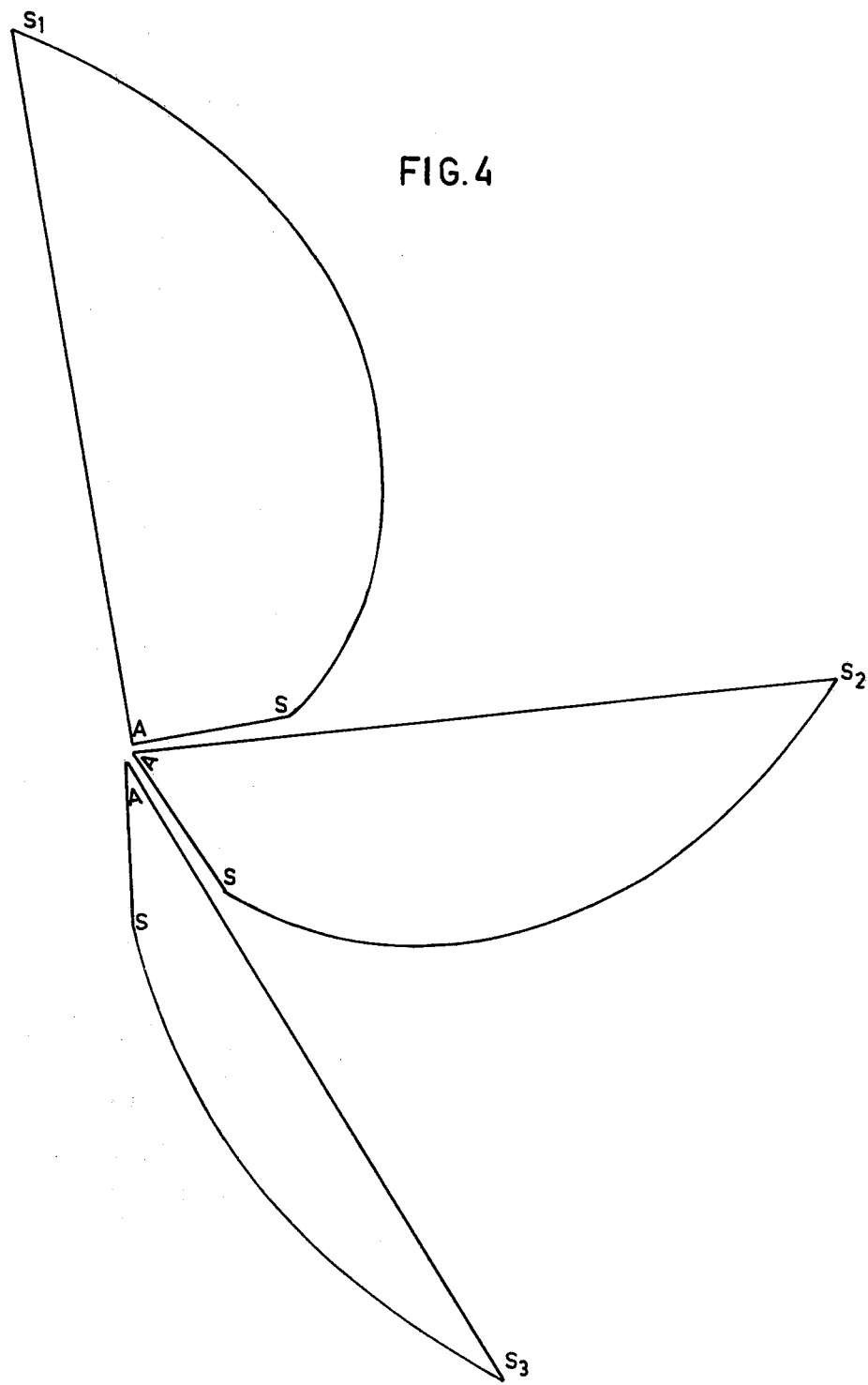
FIG. 4 shows an advantageous type of the type shown in FIG. 3.

In FIG. 4, the principle of the previous type is followed. In this case, however, the device consists of a number of stencils (three in the case shown) $ASS_1$, $ASS_2$ and $ASS_3$, the points corresponding to the points shown in FIG. 3. The construction of the angle division results from the afore-said. First the point M is determined on one leg of the angle by means of the stencil $ASS_1$. Subsequently, the circular arc MN is drawn, whereafter the points P and O, respectively are determined on this circular arc. By linking the points AP and AO, the angle is divided into three equal parts.

FIG. 4 also shows how the separate stencils can be assembled into one unit.

Figure 5:
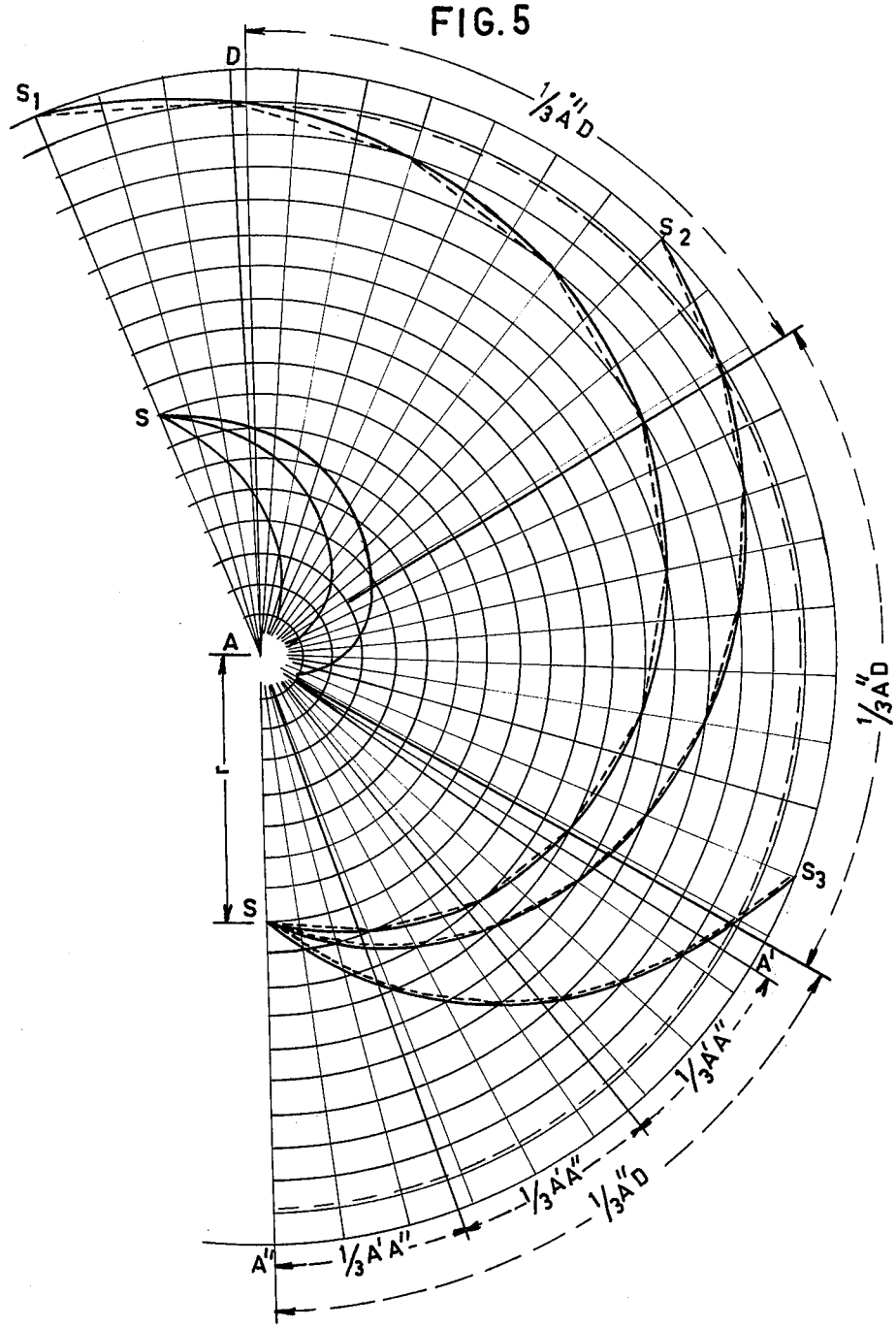
FIG. 5 shows a third type of the device according to the invention.

In the type according to FIG. 5, the surface of the right cone is flattened as well. On this flat surface, a number of describing lines and a number of circular arcs have been provided, so that a kind of webcheck- or diagram-paper is obtained. On this paper the draughtsman can himself apply the spiral line $SS_1$, $SS_2$ and $SS_3$ by simply counting an equal number of checks at the circumference of each circular arc. In the case shown, always ten checks have been counted on the outer circular arc. On the next inner circular arc, always nine checks have been counted, etc. By fluently linking the corresponding points the spiral lines are obtained. An approximation is obtained by linking the corresponding inwardly successive points by straight lines. With this self-constructed line system, the angle division can be carried out as in the previous case. FIG. 5 also shows that the spiral lines always converge on the zero line.

With the type shown in FIG. 5, any angle of 0° to 180° can be divided into $n$ equal angles (three in the case shown), and thus also any angle of 0° to 360°, because $1/n$ of an angle of 180° equals $2/n$ of an angle of 360°.

Of course, this can also apply to the other types, if the spiral line, which is the most remote from the zero line, is at more than 180° around the axis with respect to the zero line. It is obvious that in the device of FIG. 2 the separate line system can span the cylinder surface entirely, whereas the type according to FIG. 5 can span a circle of "checks" entirely.

From the fact that the device according to the invention is also appropriate for angles up to 360°, it appears that regular polygons can also be constructed with this device. An explanation thereof seems superfluous.

I claim:

1. A device for dividing an angle into equal parts or into parts with a certain proportion with respect to each other comprising
   a solid geometric figure having a surface,
   an axis of said solid geometric figure perpendicular to the plane in which the angle to be divided is lying and adjustable to pass through the vertex of the angle to be divided,
   a zero line, and additional lines corresponding to the number of angles into which the angle is to be divided described on said surface of said solid geometric figure with all of said additional lines passing through one point on said zero line,
   a first radial means positioned at said zero line and adjustable for placement at one of the legs of the angle to be divided,
   a rotating adjustable means to rotate around said axis to follow a said additional line,
   said rotating adjustable means including an adjustable element extending in a plane perpendicular to said axis and slidable over said surface and thereby crossing said additional lines at points to designate placements of said rotating adjustable means to divide the angle into equal or proportional parts.

2. The device according to claim 1, further characterized by
   said solid geometric figure being a cylinder having top and bottom surface perpendicular to said axis,
   said adjustable element being annular and extending around said cylinder.

3. A device according to claim 1, further characterized by
   a flat flexible material on said cylinder having said lines marked thereon.

4. A device according to claim 3, further characterized by
   said first radial means and said adjustable means being clamp devices.

5. A device according to claim 1, further characterized by
   an arm of adjustable length and rotatable around and slidable along an axis mounted on a drawing board,
   said cylinder rotatably mounted at an end of said arm.

6. A device according to claim 5, further characterized by
   said arm being an arm of a lever having a counterweight attached to the end opposite the end mounting said cylinder.

* * * * *